United States Patent
Lenaerts et al.

(10) Patent No.: US 12,404,414 B2
(45) Date of Patent: Sep. 2, 2025

(54) AQUEOUS INKJET INKS AND INKJET PRINTING METHODS

(71) Applicant: AGFA NV, Mortsel (BE)

(72) Inventors: Jens Lenaerts, Mortsel (BE); Nadine Willems, Mortsel (BE)

(73) Assignee: Agfa NV, Mortsel (BE)

( * ) Notice: Subject to any disclaimer, the term of this patent is extended or adjusted under 35 U.S.C. 154(b) by 290 days.

(21) Appl. No.: 18/253,420

(22) PCT Filed: Nov. 8, 2021

(86) PCT No.: PCT/EP2021/080911
§ 371 (c)(1),
(2) Date: May 18, 2023

(87) PCT Pub. No.: WO2022/106236
PCT Pub. Date: May 27, 2022

(65) Prior Publication Data
US 2024/0043709 A1 Feb. 8, 2024

(30) Foreign Application Priority Data

Nov. 20, 2020 (EP) .................... 20208787

(51) Int. Cl.
*B41J 2/21* (2006.01)
*C09D 11/322* (2014.01)
(Continued)

(52) U.S. Cl.
CPC ........... *C09D 11/326* (2013.01); *B41J 2/2107* (2013.01); *C09D 11/322* (2013.01); *C09D 11/324* (2013.01); *C09D 11/40* (2013.01)

(58) Field of Classification Search
CPC ...... B41J 2/2107; C09D 11/40; C09D 11/322; C09D 11/324; C09D 11/326
See application file for complete search history.

(56) References Cited

U.S. PATENT DOCUMENTS

| | | | |
|---|---|---|---|
| 6,786,959 B2* | 9/2004 | Hakiri | C09D 11/38 106/31.86 |
| 8,733,920 B2* | 5/2014 | Nakagawa | C09D 11/38 347/100 |

(Continued)

FOREIGN PATENT DOCUMENTS

| | | |
|---|---|---|
| CN | 111032798 A | 4/2020 |
| CN | 111484773 A | 8/2020 |

(Continued)

OTHER PUBLICATIONS

European Patent Office, International Search Report in International Patent Application No. PCT/EP2021/080911, mailed Feb. 11, 2022, 4 pp.

(Continued)

*Primary Examiner* — Anh T Vo
(74) *Attorney, Agent, or Firm* — Leydig, Voit & Mayer, Ltd.

(57) ABSTRACT

An aqueous inkjet ink containing a yellow pigment selected from the group consisting of C.I. Pigment Yellow 83, C.I. Pigment Yellow 97, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof; a non-ionic polymeric dispersant NID; and an anionic polymeric dispersant ID; wherein the weight ratio R of the anionic polymeric dispersant ID to the non-ionic polymeric dispersant NID is between 0.1 and 1.5.

15 Claims, 1 Drawing Sheet

(51) Int. Cl.
    *C09D 11/324* (2014.01)
    *C09D 11/326* (2014.01)
    *C09D 11/40* (2014.01)

(56) References Cited

U.S. PATENT DOCUMENTS

| | | | |
|---|---|---|---|
| 2007/0222832 A1* | 9/2007 | Yahiro | B41J 2/17509 347/85 |
| 2009/0033729 A1* | 2/2009 | Bauer | C09D 11/40 106/31.77 |
| 2013/0242013 A1 | 9/2013 | Nonogaki et al. | |
| 2013/0258007 A1 | 10/2013 | Hasegawa et al. | |

FOREIGN PATENT DOCUMENTS

| | | |
|---|---|---|
| EP | 2684919 A1 | 1/2014 |
| EP | 2865527 A1 | 4/2015 |
| EP | 3447098 A1 | 2/2019 |
| GB | 2367299 A | 4/2002 |
| JP | H10-36743 A | 2/1998 |
| JP | 2007-197490 A | 8/2007 |
| WO | 2019/038173 A1 | 2/2019 |

OTHER PUBLICATIONS

European Patent Office, Written Opinion in International Patent Application No. PCT/EP2021/080911, mailed Feb. 11, 2022, 5 pp.

* cited by examiner

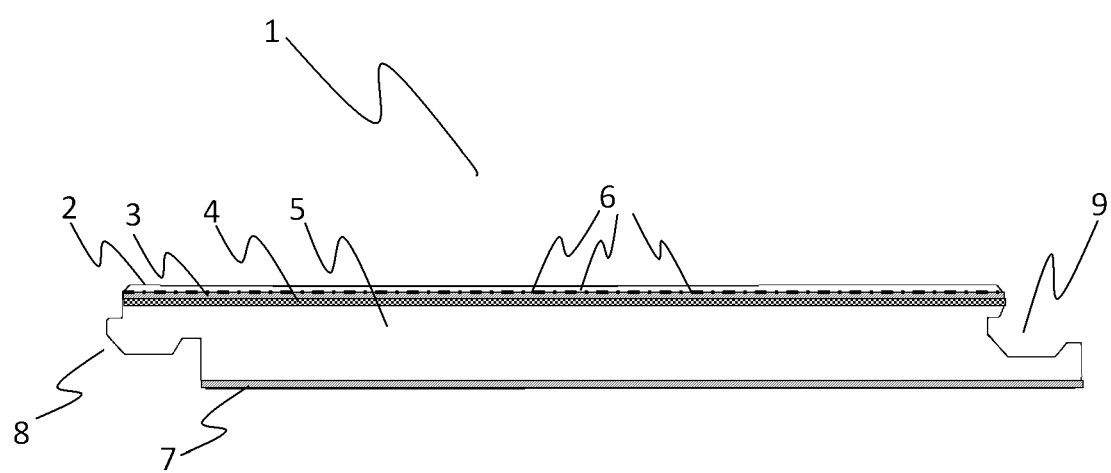

AQUEOUS INKJET INKS AND INKJET PRINTING METHODS

CROSS-REFERENCE TO RELATED APPLICATIONS

This patent application is the U.S. national stage of International Patent Application No. PCT/EP2021/080911, filed Nov. 8, 2021, which claims the benefit of European Patent Application No. 20208787.0, filed Nov. 20, 2020.

TECHNICAL FIELD

The present invention relates to yellow aqueous inkjet inks and inkjet printing therewith for manufacturing decorative panels, such as flooring, kitchen, furniture and wall panels.

BACKGROUND ART

Traditionally, gravure printing was used for manufacturing laminate flooring panels. For short production runs and personalized products, inkjet technology has now also found some implementation in production lines.

For laminate flooring panels, the use of a "standard" ink set of CMYK inks was found to be insufficient to solve problems of true wood colour reproduction. Improvement was made by using a CRYK inkjet ink set, wherein a red ink R replaced the magenta ink M. Using such a CRYK ink set, it has been observed that yellow pigmented inkjet inks tend to be less efficient in producing colour compared to the other colour inkjet inks, thus requiring a higher concentration of the pigment in the ink. This not only leads to a more expensive ink, but also causes decreased dispersion stability and consequently decreased printing reliability. The latter is of high importance in an industrial manufacturing environment.

The most common approach for improving dispersion stability is the design of the polymeric dispersant. For example, EP 2684919 A (TOYO INK) discloses an inkjet pigment ink, which comprises a pigment selected from the group consisting of C.I. Pigment Yellow 74 having a transmittance of 70% or more, C.I. Pigment Red 269 having a transmittance of 70% or more, C.I. Pigment Red 122 having a transmittance of less than 70%, and C.I. Pigment Yellow 150; a water-soluble solvent selected from the group consisting of a glycol ether and a diol; water; and a pigment dispersing resin being a copolymer which contains a monomer A, a monomer B, and a monomer C as unit components, and the monomer A is an alkyl (meth)acrylate ester, the monomer B is styrene, α-methyl styrene, or benzyl (meth)acrylate, and the monomer C is (meth)acrylic acid.

On how to improve the colour strength of a yellow inkjet ink, let alone specifically for manufacturing decorative panels, the literature remains silent. Inkjet ink sets for manufacturing decorative panels have been disclosed. For example, EP 3447098 A (AGFA) discloses a pigmented aqueous inkjet ink set for manufacturing decorative panels comprising a) optionally a cyan aqueous inkjet ink containing a copper phthalocyanine pigment; b) a red aqueous inkjet ink containing a red pigment selected from the group consisting of C.I. Pigment Red 254, C.I. Pigment Red 122, C.I. Pigment Red 176 and mixed crystals thereof; c) a yellow aqueous inkjet ink containing a pigment 0.1 Pigment Yellow 150 or a mixed crystal thereof; and d) a black aqueous inkjet ink containing a carbon black pigment; wherein the aqueous inkjet inks contain a surfactant.

Hence, there is still a need for cost-effective yellow aqueous inkjet inks exhibiting good printing reliability and improved colour strength.

SUMMARY OF INVENTION

In order to overcome the problems described above, preferred embodiments of the present invention have been realised with an aqueous inkjet ink containing a yellow pigment selected from the group consisting of C.I. Pigment Yellow 83, C.I. Pigment Yellow 97, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof; a non-ionic polymeric dispersant NID; and an anionic polymeric dispersant ID; wherein the weight ratio R of the anionic polymeric dispersant ID to the non-ionic polymeric dispersant NID is between 0.1 and 1.5.

It was surprisingly found that good dispersion stability and colour strength of an aqueous inkjet ink containing a specific yellow pigment could be achieved by using a combination of a non-ionic polymeric dispersant and an anionic polymeric dispersant in a specific weight ratio. It is not fully understood how the mechanism functions that increases the optical density while the amount of pigment remains the same.

Another object of the invention is to provide an improved method of manufacturing decorative panels, wherein the yellow aqueous inkjet ink produced higher optical density and chroma in colour images that was not negatively impacted by the thermosetting resin impregnation and heat pressing steps that followed inkjet printing.

Further advantages and embodiments of the present invention will become apparent from the following description.

BRIEF DESCRIPTION OF DRAWINGS

FIG. 1 shows a cross-section of an embodiment of a decorative panel (1) including, in order, a protective layer (2), an outermost ink receiving layer (3), an inner ink receiving layer (4), a core layer (5) with a tongue (8) and a groove (9) and a balancing layer (7), wherein the one or more ink receiving layers include a jetted and dried colour image (6).

DETAILED DESCRIPTION

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc. Unless otherwise specified a substituted or unsubstituted alkyl group is preferably a $C_1$ to $C_6$-alkyl group.

Pigmented Aqueous Inkjet Inks

An aqueous inkjet ink according to a preferred embodiment of the invention contains a yellow pigment selected from the group consisting of C.I. Pigment Yellow 83, C.I. Pigment Yellow 97, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I.

Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof; a non-ionic polymeric dispersant NID; and an anionic polymeric dispersant ID; wherein the weight ratio R of the anionic polymeric dispersant ID to the non-ionic polymeric dispersant NID is between 0.1 and 1.5, more preferably between 0.2 and 1.2, most preferably between 0.3 and 1.0.

In a preferred embodiment of the aqueous inkjet ink, the yellow pigment is C.I. Pigment Yellow 150 or a mixed crystal thereof. It was found that the coloristic properties of C.I. Pigment Yellow 150 were ideal for making true wood colour reproduction in laminate flooring panels, while it was also best in class for light fading of the colour image in decorative panels.

The aqueous inkjet ink as claimed preferably contains the yellow pigment in an amount of 2.0 to 5.0 wt % of yellow pigment based on the total weight of the inkjet ink.

The pigment in the aqueous inkjet ink preferably has an average particle size as measured by dynamic light scattering between 100 and 200 nm.

The above described pigmented inkjet ink is preferably part of a pigmented aqueous inkjet ink set.

A preferred pigmented aqueous inkjet ink set for manufacturing decorative panels comprises: a) a cyan aqueous inkjet ink containing a copper phthalocyanine pigment; b) a red aqueous inkjet ink containing a red pigment selected from the group consisting of C.I. Pigment Red 122, C.I. Pigment Red 176, C.I. Pigment Red 188, C.I. Pigment Red 207, C.I. Pigment Red 242, C.I. Pigment Red 254, C.I. Pigment Red 272 and mixed crystals thereof. c) a yellow aqueous inkjet ink as described above; and d) a black aqueous inkjet ink containing a carbon black pigment.

A pigmented aqueous inkjet ink set according to a more preferred embodiment comprises: a) a cyan aqueous inkjet ink containing a copper phthalocyanine pigment; b) a red aqueous inkjet ink containing a red pigment selected from the group consisting of C.I. Pigment Red 254, C.I. Pigment Red 122, C.I. Pigment Red 176 and mixed crystals thereof; c) a yellow aqueous inkjet ink containing a pigment 0.1 Pigment Yellow 150 or a mixed crystal thereof; and d) a black aqueous inkjet ink containing a carbon black pigment; wherein the aqueous inkjet inks preferably contain a surfactant. In an even more preferred embodiment, the aqueous inkjet ink set consists of the cyan, red, yellow and black aqueous inkjet inks. The advantage of using such an inkjet ink set is mainly an economical benefit. By using only the specific four inkjet inks CRYK, a less expensive inkjet printing device can be made and used and consequently also cheaper maintenance is obtained, although an excellent reproduction of wood motif colour images is still achieved.

In a preferred embodiment of the pigmented aqueous inkjet ink set, the pigmented aqueous inkjet inks have a static surface tension at 25° C. between 19.0 mN.m and 37.0 mN.m for good spreading on the décor paper.

In a preferred embodiment of the pigmented aqueous inkjet ink set, the pigmented aqueous inkjet inks all have a pigment concentration of at least 2.0 wt % with the weight percentage wt % based on the total weight of the pigmented aqueous inkjet inks. With a pigment concentration of at least 2.0 wt %, more preferably at least 2.2 wt %, very dark coloured wood motifs can be produced without applying too much inkjet ink, which can result in reduced adhesion of the protective layer to the decorative layer.

The application of the inkjet ink is preferably limited to a dry weight of no more than 5.0 g/m², more preferably no more than 4.0 g/m² or even 3.0 g/m 2. A higher amount can lead to delamination, i.e. adhesion problems, because the ink layer acts as a barrier layer for water vapour formed by the crosslinking of the thermosetting resin.

The pigment concentration in all aqueous inkjet inks is preferably between 2.0 and 5.0 wt % with the wt % based on the total weight of the ink. Higher pigment concentration limits increases the graininess. However, for improving graininess, the pigmented aqueous inkjet ink set may contain one or more light coloured inkjet inks, such as a light black inkjet ink. Light cyan and light red inkjet inks may also be included. A light yellow inkjet ink is preferably not included as it does not negatively impact image quality that much.

Colour Pigments

For reasons of light fastness of the decorative panels, the colorants in the aqueous inkjet inks are colour pigments and not dyes. Organic and/or inorganic pigments may be used, but preferably organic colour pigments are used because they allow to maximize colour gamut. A single pigment or a mixture of pigments may be used in the aqueous inkjet inks.

The yellow pigment is selected from the group consisting of C.I. Pigment Yellow 83, C.I. Pigment Yellow 97, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof. Particularly preferred as yellow pigment is C.I. Pigment Yellow 150 or a mixed crystal, most preferably C.I. Pigment Yellow 150, as it exhibits excellent light fastness.

For reproducing wood motifs in the decorative panels, use is made of an inkjet ink set containing a cyan, red, yellow and black inkjet inks.

A preferred pigmented aqueous inkjet ink set for manufacturing decorative panels comprises a) a cyan aqueous inkjet ink containing a copper phthalocyanine pigment; b) a red aqueous inkjet ink containing a red pigment selected from the group consisting of C.I. Pigment Red 122, C.I. Pigment Red 176, C.I. Pigment Red 188, C.I. Pigment Red 207, C.I. Pigment Red 242, C.I. Pigment Red 254, C.I. Pigment Red 272 and mixed crystals thereof. c) a yellow aqueous inkjet ink as described above; and d) a black aqueous inkjet ink containing a carbon black pigment. The selected pigments in the above ink set are not alone good choices for reproducing wood decorative patterns, but also exhibit good light fastness.

Particularly preferred pigments for a red aqueous inkjet ink are 0.1 Pigment Red 254 and C.I. Pigment Red 122, C.I. Pigment Red 176 and mixed crystals thereof.

The pigment for the red ink is most preferably C.I. Pigment Red 254 or a mixed crystal thereof, most preferably C.I. Pigment Red 254.

The colour pigment for the cyan aqueous inkjet ink preferably includes a cyan pigment selected from C.I. Pigment Blue 15:3 and C.I. Pigment Blue 15:4, more preferably C.I. Pigment Blue 15:3.

These colour pigments are readily available from commercial sources, such as CLARIANT and SUN CHEMICAL.

For the black ink, suitable carbon black pigments are Regal™ 400R, Mogul™ L, Elftex™ 320 from Cabot Co., or Carbon Black FW18, Special Black™ 250, Special Black™ 350, Special Black™ 550, Printex™ 25, Printex™ 35, Printex™ 55, Printex™ 90, Printex™ 150T from EVONIK, MA8 from MITSUBISHI CHEMICAL Co.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions.

Also mixtures of pigments may be used. For example, the black aqueous inkjet ink may include a carbon black pigment and at least one pigment selected from the group consisting of a blue pigment, a cyan pigment, magenta pigment and a red pigment. It was found that such a black inkjet ink allowed easier and better colour management for wood colours, as it produces a more neutral black colour.

The pigment particles in the pigmented inkjet ink should be sufficiently small to permit free flow of the ink through the inkjet printing device, especially at the ejecting nozzles. It is also desirable to use small particles for maximum colour strength and to slow down sedimentation.

The average particle size of pigment particles is determined with analytic equipment based upon the principle of dynamic light scattering. Light stability The average particle size of the pigment in the pigmented inkjet ink should be between 50 nm and 300 nm. Preferably, the average pigment particle size is between 100 and 200 nm. Below an average particle size of 100 nm, a reduction is often observed in light fastness. Above an average particle size of 200 nm, the colour gamut is usually reduced. The colour gamut represents the number of colours that can be produced with a certain inkjet ink set.

Dispersants

The pigmented inkjet ink containing the above described yellow pigment contains a combination of a non-ionic polymeric dispersant NID and an anionic polymeric dispersant ID in a weight ratio R of the anionic polymeric dispersant ID to the non-ionic polymeric dispersant NID between 0.1 and 1.5, more preferably between 0.2 and 1.2.

For dispersing the pigment in the other coloured inkjet inks (cyan, red, black), no restrictions apply and a single polymeric dispersant can be used.

An anionic polymeric dispersant ID contains ionic groups when present in the inkjet ink at an alkaline pH (pH>7.0). These ionic groups are negatively charged groups, such as dissociated sulfonic acid groups and dissociated carboxylic acid groups. The ionic groups are most preferably dissociated carboxylic acid groups or salts thereof, as these groups interact rapidly with cationic groups present in the one or more ink receiving layers, e.g. from polyvalent metal salts. Such interaction immobilizes the colour pigment on the paper substrate, leading to an improved image quality as coalescence and ink bleeding is minimized.

The non-ionic polymeric dispersant contains no or very few ionic groups, preferably it does not contain ionic groups at all. Such non-ionic polymeric dispersant can be identified by determining the acid value. The acid value is defined as the number of mg of potassium hydroxide required to neutralise the free acid groups in 1 g of sample, and can be measured by direct titration with a standard potassium hydroxide solution. The non-ionic polymeric dispersant should preferably have an acid value of no more than 40 mg KOH/g, preferably 0 mg KOH/g.

The ionic polymeric dispersant preferably has an acid value of 75 to 250 mg KOH/g, preferably more than 150 mg KOH/g.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:
   statistically polymerized monomers (e.g. monomers A and B polymerized into ABBAABAB);
   alternating polymerized monomers (e.g. monomers A and B polymerized into ABABABAB);
   gradient (tapered) polymerized monomers (e.g. monomers A and B polymerized into AAABAABBABBB);
   block copolymers (e.g. monomers A and B polymerized into AAAAABBBBBB) wherein the block length of each of the blocks (2, 3, 4, 5 or even more) is important for the dispersion capability of the polymeric dispersant;
   graft copolymers (graft copolymers consist of a polymeric backbone with polymeric side chains attached to the backbone); and
   mixed forms of these polymers, e.g. blocky gradient copolymers.

Suitable dispersants are DISPERBYK™ dispersants from BYK CHEMIE, Dispex™ and EFKA™ dispersants from BASF, JONCRYL™ dispersants from JOHNSON POLYMERS and SOLSPERSE™ dispersants from ZENECA Suitable polymeric dispersants are also disclosed by MC CUTCHEON. Functional Materials, North American Edition. Glen Rock,N.J.: Manufacturing Confectioner Publishing Co., 1990. p.110-129.

Preferred non-ionic polymeric dispersants (NID) include acrylic block copolymers. Particularly preferred is Dispex™ Ultra PX 4575 from BASF.

Preferred anionic polymeric dispersants (ID) include carboxylated acrylic copolymers and carboxylated acrylate-styrene copolymers.

A particularly preferred carboxylated acrylic copolymer is Edaplan™ 482, from MUNZING.

A particularly preferred carboxylated acrylate-styrene copolymer is Joncryl™ 678 from BASF. It is also available as Joncryl™ 8078 by BASF in a 32% solids ammonia solution of Joncryl™ 678.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

Surfactants

The aqueous inkjet inks may contain at least one surfactant. The surfactant(s) can be anionic, cationic, non-ionic, or zwitter-ionic and are usually added in a total quantity less than 1 wt % based on the total weight of the inkjet ink and particularly in a total quantity less than 0.3 wt % based on the total weight of the inkjet ink. The total quantity above is expressed as dry solids.

Suitable surfactants for the aqueous inkjet inks include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants, such as fluorinated hydrocarbons.

A particularly preferred commercial fluorosurfactant is Capstone™ FS3100 from DU PONT.

In a preferred embodiment of the aqueous inkjet ink, the surfactant is fluorosurfactant, more preferably an alkoxylated fluorosurfactant, and most preferably an alkoxylated fluorosurfactant containing a sulfonic acid group or a salt thereof.

Particularly preferred is an alkoxylated fluorosurfactant according to Formula (I):

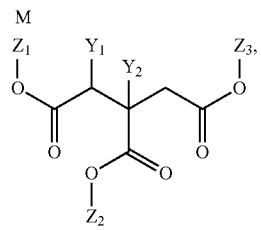

Formula (I)

wherein $Z_1$, $Z_2$ and $Z_3$ are, independently of one another, groups of the structure $R(O(CR_1R_2)_c\text{—}(CR_3R_4)_d)_e\text{—}$, branched alkyl groups, or unbranched alkyl groups, with the proviso that at least one of $Z_1$, $Z_2$ and $Z_3$ represents a group of the structure $R(O(CR_1R_2)_c\text{—}(CR_3R_4)_d)_e\text{—}$;

indices c and d are, independently of one another, 0 to 10, with the proviso that c and d are not simultaneously 0;

e is 0 to 5;

R is a branched or unbranched, fluorine-containing alkyl radical;

$R_1$ to $R_4$ are, independently of one another, hydrogen, a branched alkyl group, or an unbranched alkyl group;

Y1 is an anionic polar group and Y2 is a hydrogen atom, or vice versa; and

X is a cation, preferably a cation selected from the group $Na^+$, $Li^+$, $K^+$ and $NH_4^+$.

In a preferred embodiment, R1 to R3 represents hydrogen and R4 represents a methyl group, and more preferably the anionic polar group is a sulfonic acid group or a salt thereof.

Particularly preferred examples of alkoxylated fluorosurfactants according to Formula (I) are shown in Table 1.

TABLE 1

FS-1  M+

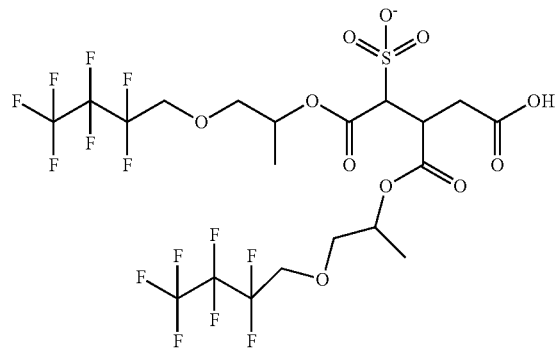

FS-2  M+

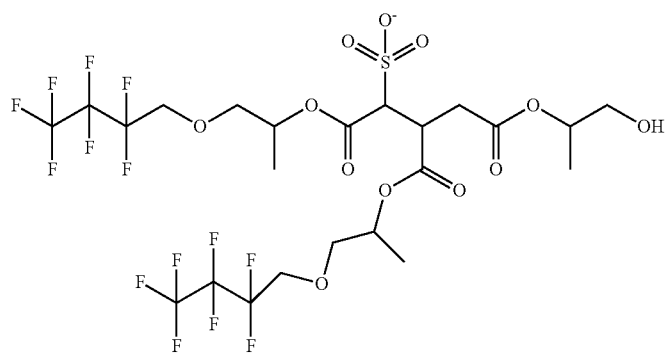

TABLE 1-continued

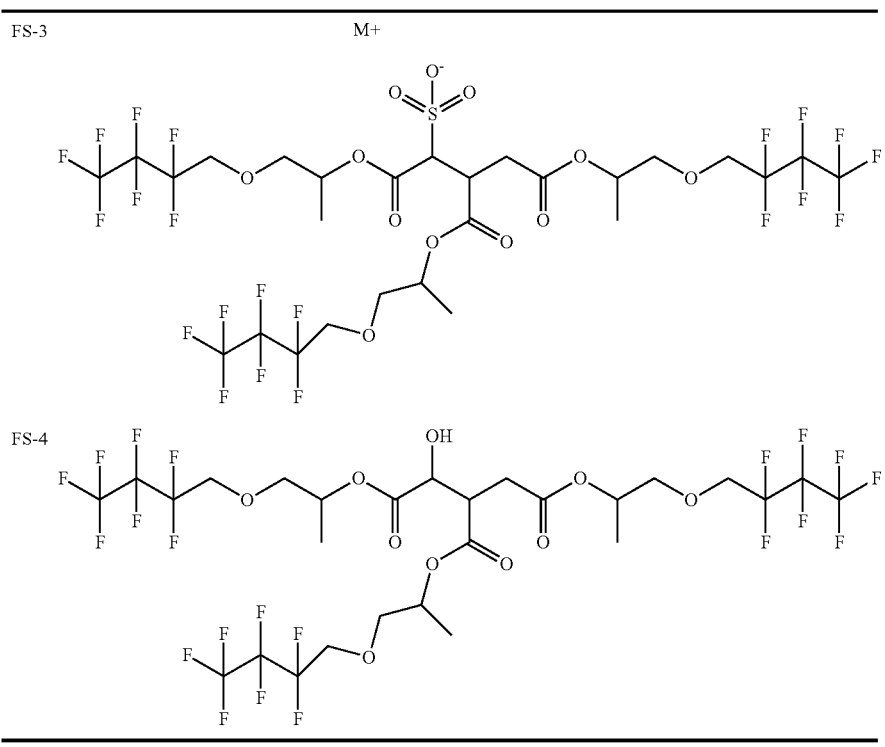

Biocides

Suitable biocides for the aqueous inkjet inks used in the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL, Proxel™ K and Proxel™ Ultra 5 available from ARCH UK BIOCIDES and Bronidox™ available from COGNIS.

A particularly preferred biocide is a1,2-benzisothiazolin-3-one based biocide.

A biocide is preferably added in an amount of 0.001 to 3.0 wt. %, more preferably 0.01 to 1.0 wt. %, each based on the total weight of the pigmented inkjet ink.

Humectants

The aqueous inkjet ink preferably contains a humectant.

Suitable humectants include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols. Preferred humectants are 2-pyrrolidone, glycerol and 1,2-hexanediol, the latter were found to be the most effective for improving inkjet printing reliability in an industrial environment.

A humectant is preferably added to the inkjet ink in an amount of 0.1 to 35 wt % of the formulation, more preferably 1 to 30 wt % of the formulation, and most preferably 2 to 25 wt % of the inkjet ink pH adjusters The aqueous inkjet ink may contain at least one pH adjuster. Suitable pH adjusters include NaOH, KOH, $NEt_3$, $NH_3$, HCl, $HNO_3$, $H_2SO_4$ and (poly)alkanolamines such as triethanol amine and 2-amino-2-methyl-1-propanol. Preferred pH adjusters are triethanol amine, NaOH and $H_2SO_4$.

The pH is preferably adjusted to a value between 7.5 and 10.0, more preferably between 8.0 and 9.0; the latter pH range has been observed to result in an improved ink stability.

Preparation of Inkjet Inks

The inkjet ink may be prepared by precipitating or milling the colour pigment in the dispersion medium in the presence of the polymeric dispersant(s).

The above described yellow pigmented inkjet ink containing a combination of a non-ionic polymeric dispersant NID and an anionic polymeric dispersant ID can either be prepared by making the pigment dispersion containing both polymeric dispersants NID and ID, or otherwise only one of them, preferably the non-ionic polymeric dispersant NID. In the latter case, the anionic polymeric dispersant ID is then added during the ink preparation to the pigment dispersion, preferably before adding other ink components.

Mixing apparatuses for making pigment dispersions may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

If the inkjet ink contains more than one pigment, the colour ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink-jet inks, the pigment is usually present in the mill grind at 1 to 50 wt %, excluding the milling media. The weight ratio of pigment over dispersant is preferably 20:1 to 1:2.

The milling time can vary widely and depends upon the pigment, selected mechanical means and residence conditions, the initial and desired final particle size, etc.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

The pigment dispersion is preferably also filtrated with a filter of 1 µm, preferably 0.5 µm to remove so-called 'over-sizers, i.e. inefficiently milled pigment particles having a much larger particle size of 2 µm or so In general, it is desirable to make the colour ink in the form of a concentrated mill grind, which is subsequently diluted to the appropriate concentration for use in the ink-jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, colour, hue, saturation density, and print area coverage for the particular application.

Viscosity can also be adjusted by using low molecular weight polyethylene glycols, for example having an average numerical molecular weight between 200 and 800. An example is PEG 200 from CLARIANT.

Decorative Panels

The decorative panels are preferably selected from the group consisting of kitchen panels, flooring panels, furniture panels, ceiling panels and wall panels.

A decorative panel, illustrated by a flooring panel having also a tongue and groove join in FIG. 1, includes preferably at least a core layer, a decorative layer and a protective layer. In order to protect the colour image of the decorative layer against wear, a protective layer is applied on top of the decorative layer. A balancing layer may also be applied at the opposite side of the core layer to restrict or prevent possible bending of the decorative panel. The assembly into a decorative panel of the balancing layer, the core layer, the decorative layer, and the protective layer, is preferably performed in the same press treatment of preferably a DPL process (Direct Pressure Laminate).

In a preferred embodiment of decorative panels, tongue and groove profiles are milled into the side of individual decorative panels which allow them to be slid into one another. The tongue and grove join ensures, in the case of flooring panels, a sturdy floor construction and protects the floor, preventing dampness from penetrating.

In a more preferred embodiment, the decorative panels include a tongue and a groove of a special shape, which allow them to be clicked into one another. The advantage thereof is an easy assembly requiring no glue. The shape of the tongue and groove necessary for obtaining a good mechanical join is well-known in the art of laminate flooring, as also exemplified in EP 2280130 A (FLOORING IND), WO 2004/053258 (FLOORING IND), US 2008010937 (VALINGE) and U.S. Pat. No. 6,418,683 (PERSTORP FLOORING).

The tongue and groove profiles are especially preferred for flooring panels and wall panels, but in the case of furniture panels, such tongue and groove profile is preferably absent for aesthetical reasons of the furniture doors and drawer fronts. However, a tongue and groove profile may be used to click together the other panels of the furniture, as illustrated by US 2013071172 (UNILIN).

The decorative panels, may further include a sound-absorbing layer as disclosed by U.S. Pat. No. 8,196,366 (UNILIN).

In a preferred embodiment, the decorative panel is an antistatic layered panel. Techniques to render decorative panels antistatic are well-known in the art of decorative surfaces as exemplified by EP 1567334 A (FLOORING IND).

The top surface of the decorative panel is preferably provided with a relief matching the colour image, such as for example the wood grain, cracks and nuts in a woodprint. Embossing techniques to accomplish such relief are well-known and disclosed by, for example, EP 1290290 A (FLOORING IND), US 2006144004 (UNILIN), EP 1711353 A (FLOORING IND) and US 2010192793 (FLOORING IND).

In a preferred embodiment, the decorative flooring panels are made in the form of rectangular oblong strips. The dimensions thereof may vary greatly. Preferably the panels have a length exceeding 1 meter, and a width exceeding 0.1 meter, e.g. the panels can be about 1.3 meter long and about 0.15 meter wide. According to a special embodiment the length of the panels exceeds 2 meter, with the width being preferably about 0.2 meter or more. The print of such panels is preferably free form repetitions.

Core Layers

The core layer is preferably made of wood-based materials, such as particle board, MDF or HDF (Medium Density Fibreboard or High Density Fibreboard), Oriented Strand Board (OSB) or the like. Use can also be made of boards of synthetic material or boards hardened by means of water, such as cement boards. In a particularly preferred embodiment, the core layer is a MDF or HDF board.

The core layer may also be assembled at least from a plurality of paper sheets, or other carrier sheets, impregnated with a thermosetting resin as disclosed by WO 2013/050910 (UNILIN). Preferred paper sheets include so-called Kraft paper obtained by a chemical pulping process also known as the Kraft process, e.g. as described in U.S. Pat. No. 4,952,277 (BET PAPERCHEM).

In another preferred embodiment, the core layer is a board material composed substantially of wood fibres, which are bonded by means of a polycondensation glue, wherein the polycondensation glue forms 5 to 20 percent by weight of the board material and the wood fibres are obtained for at least 40 percent by weight from recycled wood. Suitable examples are disclosed by EP 2374588 A (UNILIN).

Instead of a wood based core layer, also a synthetic core layer may be used, such as those disclosed by US 2013062006 (FLOORING IND). In a preferred embodiment, the core layer comprises a foamed synthetic material, such as foamed polyethylene or foamed polyvinyl chloride.

Other preferred core layers and their manufacturing are disclosed by US 2011311806 (UNILIN) and U.S. Pat. No. 6,773,799 (DECORATIVE SURFACES).

The thickness of the core layer is preferably between 2 and 12 mm, more preferably between 5 and 10 mm.

Paper Substrates

The decorative layer and preferably also the protective layer and the optional balancing layer, include paper as substrate.

The paper preferably has a weight of less than 150 g/m$^2$, because heavier paper sheets are hard to impregnate all through their thickness with a thermosetting resin. Preferably said paper layer has a paper weight, i.e. without taking into account the resin provided on it, of between 50 and 100 g/m². The weight of the paper cannot be too high, as then the amount of resin needed to sufficiently impregnate the paper would be too high, and reliably further processing the printed paper in a pressing operation becomes badly feasible.

Preferably, the paper sheets have a porosity according to Gurley's method (DIN 53120) of between 8 and 20 seconds. Such porosity allows even for a heavy sheet of more than 150 g/m² to be readily impregnated with a relatively high amount of resin.

Suitable paper sheets having high porosity and their manufacturing are also disclosed by U.S. Pat. No. 6,709,764 (ARJO WIGGINS).

The paper for the decorative layer is preferably a white paper and may include one or more whitening agents, such as titanium dioxide, calcium carbonate and the like. The presence of a whitening agent helps to mask differences in colour on the core layer, which can cause undesired colour effects on the colour image.

Alternatively, the paper for the decorative layer is preferably a bulk coloured paper including one or more colour dyes and/or colour pigments. Besides the masking of differences in colour on the core layer, the use of a coloured paper reduces the amount of inkjet ink required to print the colour image. For example, a light brown or grey paper may be used for printing a wood motif as colour image in order to reduce the amount of inkjet ink needed.

In a preferred embodiment, unbleached Kraft paper is used for a brownish coloured paper in the decorative layer. Kraft paper has a low lignin content resulting in a high tensile strength. A preferred type of Kraft paper is absorbent Kraft paper of 40 to 135 g/m² having high porosity, and made from clean low kappa hardwood Kraft of good uniformity.

If the protective layer includes a paper, then a paper is used which becomes transparent or translucent after resin impregnation so that the colour image in the decorative layer can be viewed.

The above papers may also be used in the balancing layer.

Ink Receiving Layers

One or more ink receiving layers are present on the paper substrate of the decorative layer for enhancing the image quality.

The ink receiving layer(s) may be a purely polymer based ink receiving layer, but preferably contains an inorganic pigment and a polymeric binder. The inorganic pigment may be a single type of inorganic pigment or a plurality of different inorganic pigments. The polymeric binder may be a single type of polymeric binder or a plurality of different polymeric binders.

In a preferred embodiment, the ink receiving layer(s) have a total dry weight between 1.0 g/m² and 10.0 g/m², more preferably between 2.0 and 6.0 g/m².

In a preferred embodiment, the ink receiving layer(s) include a polymeric binder selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium carboxymethyl cellulose; sodium carboxymethylhydroxethyl cellulose; water soluble ethylhydroxyethyl cellulose; cellulose sulfate; polyvinyl alcohol; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinyl-methyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar.

In a particularly preferred embodiment, the ink receiving layer(s) include a polymeric binder, preferably a water soluble polymeric binder (>1 g/L water at 25° C.), which has a hydroxyl group as a hydrophilic structural unit, e.g. a polyvinyl alcohol.

A preferred polymer for the ink receiving layer(s) is a polyvinylalcohol (PVA), a vinylalcohol copolymer or modified polyvinyl alcohol. The modified polyvinyl alcohol may be a cationic type polyvinyl alcohol, such as the cationic polyvinyl alcohol grades from Kuraray, such as POVAL C506, POVAL C118 from Nippon Goshei.

The pigment in the ink receiving layer(s) is an inorganic pigment, which can be chosen from neutral, anionic and cationic pigment types. Useful pigments include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

The inorganic pigment is preferably selected from the group consisting of alumina hydrates, aluminum oxides, aluminum hydroxides, aluminum silicates, and silicas.

Particularly preferred inorganic pigments are silica particles, colloidal silica, alumina particles and pseudo-boehmite, as they form better porous structures. When used herein, the particles may be primary particles directly used as they are, or they may form secondary particles. Preferably, the particles have an average primary particle diameter of 2 μm or less, and more preferably 200 nm or less.

A preferred type of alumina hydrate is crystalline boehmite, or γ-AlO(OH). Useful types of boehmite include DISPERAL HP14, DISPERAL 40, DISPAL 23N4-20, DISPAL 14N-25 and DISPERAL AL25 from Sasol; and MARTOXIN VPP2000-2 and GL-3 from Martinswerk GmbH Useful cationic aluminum oxide (alumina) types include α-$Al_2O_3$ types, such as NORTON E700, available from Saint-Gobain Ceramics & Plastics, Inc, and γ-$Al_2O_3$ types, such as ALUMINUM OXID C from Degussa.

Other useful inorganic pigments include aluminum trihydroxides such as Bayerite, or α-$Al(OH)_3$, such as PLURAL BT, available from Sasol, and Gibbsite, or γ-$Al(OH)_3$, such as MARTINAL grades and MARTIFIN grades from Martinswerk GmbH, MICRAL grades from JM Huber company; HIGILITE grades from Showa Denka K. K.

Another preferred type of inorganic pigment is silica, which can be used as such, in its anionic form or after cationic modification. The silica can be chosen from different types, such as crystalline silica, amorphous silica, precipitated silica, fumed silica, silica gel, spherical and non-spherical silica. The silica may contain minor amounts of metal oxides from the group Al, Zr, Ti. Useful types include AEROSIL OX50 (BET surface area 50±15 m²/g, average primary particle size 40 nm, $SiO_2$ content>99.8%, $Al_2O_3$ content<0.08%), AEROSIL MOX170 (BET surface area 170 g/m², average primary particle size 15 nm, $SiO_2$ content>98.3%, $Al_2O_3$ content AEROSIL MOX80 (BET surface area 80±20 g/m², average primary particle size 30 nm, SiO$_2$ content>98.3%, Al$_2$O$_3$ content 0.3-1.3%), or other hydrophilic AEROSIL grades available from Degussa-Huls AG, which may give aqueous dispersions with a small average particle size (<500 nm).

Generally depending on their production method, silica particles are grouped into two types, wet-process particles and dry-process (vapour phase-process or fumed) particles.

In the wet process, active silica is formed through acidolysis of silicates, and this is polymerized to a suitable degree and flocculated to obtain hydrous silica.

A vapour-phase process includes two types; one includes high-temperature vapour-phase hydrolysis of silicon halide to obtain anhydrous silica (flame hydrolysis), and the other includes thermal reduction vaporization of silica sand and coke in an electric furnace followed by oxidizing it in air to also obtain anhydrous silica (arc process). The "fumed silica" means to indicate anhydrous silica particles obtained in the vapour-phase process.

For the silica particles used in the invention, especially preferred are the fumed silica particles. The fumed silica differs from hydrous silica in point of the density of the surface silanol group and of the presence or absence of pores therein, and the two different types of silica have different properties. The fumed silica is suitable for forming a three-dimensional structure of high porosity. Since the fumed silica has a particularly large specific surface area, its ink absorption and retention are high. Preferably, the vapour-phase silica has an average primary particle diameter of 30 nm or less, more preferably 20 nm or less, even more preferably 10 nm or less, and most preferably from 3 to 10 nm. The fumed silica particles readily aggregate through hydrogen bonding at the silanol groups therein. Therefore, when their mean primary particle size is not larger than 30 nm, the silica particles may form a structure of high porosity.

In a further preferred embodiment, said ink receiving layer can be further crosslinked. Any suitable crosslinker known in the prior art can be used. Boric acid is particularly preferred as crosslinker for the ink receiving layer according to the present invention.

The ink receiving layer(s) may include other additives, such as colorants, surfactants, biocides, antistatic agents, hard particles for wear resistance, elastomers, UV absorbers, organic solvents, plasticizers, light-stabilizers, pH adjusters, antistatic agents, whitening agents, matting agents and the like.

The ink receiving layer(s) may consist of a single layer or of two, three or more layers even having a different composition.

Instead of ready-to-use paper with one or more ink receiving layers provided as a paper roll, the ink receiving layer(s) can also be applied just prior to inkjet printing by applying a primer to uncoated standard decor paper.

The ink receiving layer(s) can be coated onto the support by any conventional coating technique, such as dip coating, knife coating, extrusion coating, spin coating, slide hopper coating and curtain coating.

Alternatively, the ink receiving layer(s) can also be applied by a printing technique, such as flexographic printing, screen printing, gravure printing and inkjet printing.

Thermosetting Resins

The thermosetting resin is preferably selected from the group consisting of melamine-formaldehyde based resins, ureum-formaldehyde based resins and phenol-formaldehyde based resins.

Other suitable resins for impregnating the paper are listed in of EP 2274485 A (HUELSTA).

Most preferably the thermosetting resin is a melamine-formaldehyde based resin, often simply referred to in the art as a 'melamine (based) resin'. It has been observed that such melamine based thermosetting resin is the most transparent having the least impact on the colour strength, especially when used in the protective layer.

The melamine formaldehyde resin preferably has a formaldehyde to melamine ratio of 1.4 to 2. Such melamine based resin is a resin that polycondensates while exposed to heat in a pressing operation. The polycondensation reaction creates water as a by-product. It is particularly with these kinds of thermosetting resins, namely those creating water as a by-product, that the present invention is of interest. The created water, as well as any water residue in the thermosetting resin before the pressing, must leave the hardening resin layer to a large extent before being trapped and leading to a loss of transparency in the hardened layer. The available ink layer can hinder the diffusion of the vapour bubbles to the surface, resulting in adhesion problems.

The paper is preferably provided with an amount of thermosetting resin equaling 40 to 250% dry weight of resin as compared to weight of the paper. Experiments have shown that this range of applied resin provides for a sufficient impregnation of the paper, that avoids splitting to a large extent, and that stabilizes the dimension of the paper to a high degree.

The paper is preferably provided with such an amount of thermosetting resin, that at least the paper core is satisfied with the resin. Such satisfaction can be reached when an amount of resin is provided that corresponds to at least 1.5 or at least 2 times the paper weight.

Preferably the resin provided on said paper is in a B-stage while printing. Such B-stage exists when the thermosetting resin is not completely cross linked.

Preferably the resin provided on said paper has a relative humidity lower than 15%, and still better of 10% by weight or lower.

Preferably the step of providing said paper with thermosetting resin involves applying a mixture of water and the resin on the paper. The application of the mixture might involve immersion of the paper in a bath of the mixture and/or spraying or jetting the mixture. Preferably the resin is provided in a dosed manner, for example by using one or more squeezing rollers and/or doctor blades to set the amount of resin added to the paper layer.

Methods for impregnating a paper substrate with resin are well-known in the art as exemplified by WO 2012/126816 (VITS) and EP 966641 A (VITS).

The dry resin content of the mixture of water and resin for impregnation depends on the type of resin. An aqueous solution containing a phenol-formaldehyde resin preferably has a dry resin content of about 30% by weight, while an aqueous solution containing a melamine-formaldehyde resin preferably has a dry resin content of about 60% by weight. Methods of impregnation with such solutions are disclosed by e.g. U.S. Pat. No. 6,773,799 (DECORATIVE SURFACES).

The paper is preferably impregnated with the mixtures known from US 4109043 (FORMICA CORP) and U.S. Pat. No. 4,112,169 (FORMICA CORP), and hence preferably comprise, next to melamine formaldehyde resin, also polyurethane resin and/or acrylic resin.

The mixture including the thermosetting resin may further include additives, such as colorants, surface active ingredients, biocides, antistatic agents, hard particles for wear resistance, elastomers, UV absorbers, organic solvents, acids, bases, and the like.

The advantage of adding a colorant to the mixture containing the thermosetting resin is that a single type of white paper can be used for manufacturing the decorative layer, thereby reducing the stock of paper for the decorative laminate manufacturer. The use of a colored paper, as already described above, to reduce the amount of ink required for printing a wood motif, is here accomplished by the white paper being colored by impregnation by a brownish thermosetting resin. The latter allows a better control of the amount of brown colour required for certain wood motifs.

Antistatic agents may be used in thermosetting resin. However preferably antistatic agents, like NaCl and KCl, carbon particles and metal particles, are absent in the resin, because often they have undesired side effects such as a lower water resistance or a lower transparency. Other suitable antistatic agents are disclosed by EP 1567334 A (FLOORING IND).

Hard particles for wear resistance are preferably included in a protective layer.

Decorative Layers

The decorative layer includes a thermosetting resin impregnated paper and a colour image printed thereon by inkjet. In the assembled decorative panel, the colour image is located on the resin impregnated paper on the opposite side than the side facing the core layer.

A decorative panel, like a floor panel, has on one side of the core layer a decorative layer and a balancing layer on the other side of the core layer. However, a decorative layer may be applied on both sides of the core layer. The latter is especially desirable in the case of laminate panels for furniture. In such a case, preferably also a protective layer is applied on both decorative layers present on both sides of the core layer.

A multi-colour image is obtained by jetting and drying aqueous inkjet inks of an aqueous inkjet ink set upon the one or more ink receiving layers.

There is no real restriction on the content of the colour image. The colour image may also contain information such as text, arrows, logo's and the like. The advantage of inkjet printing is that such information can be printed at low volume without extra cost, contrary to gravure printing.

In a preferred embodiment, the colour image is a wood reproduction or a stone reproduction, but it may also be a fantasy or creative image, such as an ancient world map or a geometrical pattern, or even a single colour for making, for example, a floor consisting of black and yellow tiles or a single colour furniture door.

An advantage of printing a wood colour image is that a floor can be manufactured imitating besides oak, pine and beech, also very expensive wood like black walnut which would normally not be available for house decoration.

An advantage of printing a stone colour image is that a floor can be manufactured which is an exact imitation of a stone floor, but without the cold feeling when walking barefooted on it.

Protective Layers

A protective layer is applied above the printed colour image after printing, e.g. by way of an overlay, i.e. a resin provided carrier, or a liquid coating, preferably while the decor layer is laying on the core layer, either loosely or already connected or adhered thereto.

In a preferred embodiment, the carrier of the overlay is a paper impregnated by a thermosetting resin that becomes transparent or translucent after heat pressing, preferably in a DPL process.

A preferred method for manufacturing such an overlay is described in US 2009208646 (DEKOR-KUNSTSTOFFE).

The liquid coating includes preferably a thermosetting resin, but may also be another type of liquid such as a UV- or an EB-curable varnish.

In a particularly preferred embodiment, the liquid coating includes a melamine resin and hard particles, like corundum.

The protective layer is preferably the outermost layer, but in another embodiment a thermoplastic or elastomeric surface layer may be coated on the protective layer, preferably of pure thermoplastic or elastomeric material. In the latter case, preferably a thermoplastic or elastomeric material based layer is also applied on the other side of the core layer.

Liquid melamine coatings are exemplified in DE 19725289 C (ITT MFG ENTERPRISES) and U.S. Pat. No. 3,173,804 (RENKL PAIDIWERK).

The liquid coating may contain hard particles, preferably transparent hard particles. Suitable liquid coatings for wear protection containing hard particles and methods for manufacturing such a protective layer are disclosed by US 2011300372 (CT FOR ABRASIVES AND REFRACTORIES) and U.S. Pat. No. 8,410,209 (CT FOR ABRASIVES AND REFRACTORIES).

The transparency and also the colour of the protective layer can be controlled by the hard particles, when they comprise one or a plurality of oxides, oxide nitrides or mixed oxides from the group of elements Li, Na, K, Ca, Mg, Ba, Sr, Zn, Al, Si, Ti, Nb, La, Y, Ce or B.

The total quantity of hard particles and transparent solid material particles is typically between 5% by volume and 70% by volume, based on the total volume of the liquid coating. The total quantity of hard particles is between 1 $g/m^2$ and 100 $g/m^2$, preferably 2 $g/m^2$ to 50 $g/m^2$.

If the protective layer includes a paper as carrier sheet for the thermosetting resin, then the hard particles, such as aluminium oxide particles, are preferably incorporated in or on the paper. Preferred hard particles are ceramic or mineral particles chosen from the group of aluminium oxide, silicon carbide, silicon oxide, silicon nitride, tungsten carbide, boron carbide, and titanium dioxide, or from any other metal oxide, metal carbide, metal nitride or metal carbonitride. The most preferred hard particles are corundum and so-called Sialon ceramics. In principle, a variety of particles may be used. Of course, also any mixture of the above-mentioned hard particles may be applied.

The amount of hard particles in the protective layer may be determined in function of the desired wear resistance, preferably by a so-called Taber test as defined in EN 13329 and also disclosed in WO 2013/050910 A (UNILIN) and U.S. Pat. No. 8,410,209 (CT FOR ABRASIVES AND REFRACTOR).

Hard particles having an average particle size of between 1 and 200 μm are preferred. Preferably an amount of such particles of between 1 and 40 $g/m^2$ is applied above the printed image. An amount lower than 20 $g/m^2$ can suffice for the lower qualities.

If the protective layer includes a paper, then it preferably has a paper weight of between 10 and 50 $g/m^2$. Such a paper is often also referred to as a so-called overlay commonly used in laminate panels. Preferred methods for manufacturing such an overlay are disclosed by WO 2007/144718 (FLOORING IND).

Preferably the step of providing the protective layer of thermosetting resin above the printed image involves a press treatment. Preferably a temperature above 150° C. is applied in the press treatment, more preferably between 180° and 220° C., and a pressure of more than 20 bar, more preferably between 35 and 40 bar.

In a very preferred embodiment, the decorative panel is manufactured using two press treatments, because this results in an extremely high abrasion resistance. Indeed, during the first press treatment, preferably the layers immediately underlying the wear resistant protective layer are substantially or wholly cured. The hard particles comprised in the wear resistant protective layer are thereby prevented from being pushed down out of the top area of the floor panel into the colour image or below the colour image and stay in the zone where they are most effective, namely essentially above the colour image. This makes it possible to reach an initial wear point according to the Taber test as defined in EN 13329 of over 10000 rounds, where in one press treatment of layers with the same composition only just over 4000 rounds were reached. It is clear that the use of two press treatments as defined above, leads to a more effective use of available hard particles. An alternative advantage of using at least two press treatments lays in the fact that a similar wearing rate, as in the case where a single press treatment is used, can be obtained with less hard particles if the product is pressed twice. Lowering the amount of hard particles is interesting, since hard particles tend to lower the transparency of the wear resistant protective layer, which is undesirable. It becomes also possible to work with hard particles of smaller diameter, e.g. particles having an average particle diameter of 15 μm or less, or even of 5 μm or less.

Balancing Layers

The main purpose of the balancing layer(s) is to compensate tensile forces by layers on the opposite side of the core layer, so that an essentially flat decorative panel is obtained. Such a balancing layer is preferably a thermosetting resin layer, that can comprise one or more carrier layers, such as paper sheets.

As already explained above for a furniture panel, the balancing layer(s) may be a decorative layer, optionally complemented by a protective layer.

Instead of one or more transparent balancing layers, also an opaque balancing layer may be used which gives the decorative panel a more appealing look by masking surface irregularities. Additionally, it may contain text or graphical information such as a company logo or text information.

Inkjet Printing Methods

An inkjet printing method for manufacturing decorative panels according to a preferred embodiment of the invention comprising the steps of a) providing a paper substrate including one or more ink receiving layers; b) jetting a colour image with pigmented aqueous inkjet inks from the pigmented aqueous inkjet ink set as described above on the paper substrate including one or more ink receiving layers; and c) drying the jetted colour image.

The application of ink receiving layers on the paper substrate allow to achieve a desired image quality without the need of a polymer latex binder in the aqueous inkjet inks. The presence of polymer latex binder usually reduces the adhesion of the protective layer to the decorative layer. In a preferred embodiment, no polymer latex binder is present in one or more of the aqueous pigmented inkjet inks, preferably none of the pigmented aqueous inkjet inks contain a polymeric latex binder.

Although single pass inkjet printing allows for high productivity, albeit at a large investment cost for the inkjet printer, the inkjet printing method is preferably performed in a multi-pass mode. When the jetting of the colour image by the inkjet print heads is performed in 2, 3, 4 or more passes, the presence of failing nozzles can be masked to a level wherein it becomes no longer visible that a nozzle is not firing inkjet ink. The latter is usually immediately visible in a single pass inkjet printing process, thus creating substantial amount of waste and economic penalties.

Decorative panels often use a wood motif having wood nerves as a colour image. It was observed that improved image quality is obtained when the inkjet printing is performed in a manner that the wood nerves in the colour image are extending in a direction substantially corresponding to the inkjet printing direction. For a single pass inkjet printing process, the inkjet printing direction is the transport direction of the paper substrate. In a multi-pass inkjet printing process, the inkjet printing direction is the scanning direction of the print heads.

In a preferred embodiment of the inkjet printing method, the paper substrate includes multiple ink receiving layers, wherein an outermost ink receiving layer contains no inorganic pigment or an amount of inorganic pigment smaller than that of the one or more ink receiving layers located between the paper substrate and the outermost ink receiving layer. The advantage is that the printing reliability is enhanced. For fast drying, the ink receiving layers contain high amounts of inorganic pigments, such as microporous silica, which can create dust problems due to the transporting of the paper substrate in the inkjet printer, especially in a single pass inkjet printing pass where very high speeds for transporting the paper substrate below the print heads are used. This dust problem is reduced by having an outermost ink receiving layer containing no or only a small amount of inorganic pigments.

In a preferred embodiment of the inkjet printing method, the paper substrate is a coloured paper substrate, more preferably a bulk coloured paper substrate. The use of a coloured paper substrate reduces the amount of inkjet ink required to form the colour image.

In a preferred embodiment of the inkjet printing method, the one or more ink receiving layers include an inorganic pigment selected from the group consisting of alumina hydrates, aluminum oxides, aluminum hydroxides, aluminum silicates, and silicas. The latter inorganic pigments allow for fast drying and high image quality.

In a preferred embodiment of the inkjet printing method, the one or more ink receiving layers contain a polymeric binder selected from the group consisting of polyvinylalcohol, a vinylalcohol copolymer or modified polyvinyl alcohol. The latter polymeric binders are very hydrophilic and allow fast penetration of the liquids in the aqueous inkjet inks, again enhancing drying and high image quality.

For having a good ejecting ability, the viscosity of the one or more aqueous inkjet inks at a temperature of 32° C. is preferably smaller than 15 mPa·s, and most preferably between 4 and 8 mPa·s all at a shear rate of 1,000 $s^{-1}$. The jetting temperature is between 10 and 70° C., preferably between 20 and 40° C., and most preferably between 25 and 38° C. In those ranges printing reliability is enhanced due to improved latency, as the evaporation of the liquid components in the inkjet inks at the nozzle of a print head is limited.

Methods of Manufacturing Decorative Panels

A method of manufacturing a decorative panels includes the method of inkjet printing as described above.

In a preferred embodiment of the method for manufacturing decorative panels including the above described inkjet printing method, the paper substrate having the jetted and dried colour image is impregnated with a thermosetting resin.

In a preferred embodiment of the method for manufacturing decorative panels including the above described inkjet printing method, the impregnated paper substrate is heat pressed between a core layer and a protective layer and cut into a decorative panel selected from the group consisting of flooring, kitchen, furniture and wall panels. The protective layer preferably includes a melamine-based thermosetting resin.

In a preferred embodiment of the method for manufacturing decorative panels, the decorative panel includes a tongue and a groove capable of achieving a glue less mechanical join between decorative panels.

Preferably the inkjet printing method of the invention is part of a DPL process, wherein the decorative layer is taken up in a stack to be pressed with the core layer and a protective layer, and preferably also a balancing layer. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

In a preferred embodiment, a protective layer containing a thermosetting resin is applied onto the inkjet printed colour image, wherein the thermosetting resin may be a colored thermosetting resin to reduce the amount of inkjet ink to be printed.

The method of manufacturing a decorative surface preferably includes providing a relief in at least the protective layer, more preferably by means of a short cycle embossing press. The embossing preferably takes place at the same time that the core layer, the decorative layer and the protective layer, and preferably also one or more balancing layers, are pressed together. The relief in the protective layer preferably corresponds to the colour image.

Preferably the relief comprises portions that have been embossed over a depth of more than 0.5 mm, or even more than 1 mm, with respect to the global upper surface of the decorative panel. The embossments may extend into the decorative layer.

The balancing layer of a decorative panel is preferably planar. However, a relief might be applied in the balancing layer(s) for improving gluing down of the panels and/or for improved slip resistance and/or for improved, i.e. diminished, sound generation or propagation.

It should be clear that the use of more than one press treatment is also advantageous for the manufacturing of decorative surfaces. Such technique could be used for the manufacturing of any panel that comprises on the one hand a wear resistant protective layer on the basis of a thermosetting synthetic material, possibly a carrier sheet such as paper, and hard particles, and, on the other hand, one or more layers underlying the wear resistant protective layer on the basis of thermosetting synthetic material. The underlying layers may comprise a decorative layer, such as an inkjet printed paper provided with thermosetting resin. As a core layer, such panel might essentially comprise a board material with a density of more than 500 kg/m$^3$, such as an MDF or HDF board material. The manufacturing panels with a plurality of press treatments is preferably put in practice with the so-called DPL panels (Direct Pressure Laminate). In the latter case, during a first press treatment, at least the decorative layer provided with thermosetting resin, is cured and attached to the core material, preferably an MDF or HDF board material, whereby a whole is obtained of at least the decorative layer and the board material, and possibly a balancing layer at the side of the board opposite the decor layer. During a second press treatment, the wear resistant layer is cured and attached to the obtained whole.

In another embodiment, the method for manufacturing a decorative surface uses the inkjet printing method according to the present invention in combination with the methodology disclosed by US 2011008624 (FLOORING IND), wherein the protective layer includes a substance that hardens under the influence of ultraviolet light or electron beams.

Inkjet Printing Devices

The one or more aqueous inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method according to the present invention is not restricted to piezoelectric inkjet printing. Other inkjet print heads can be used and include various types, such as a continuous type.

In a multi-pass inkjet printing process, the inkjet print head scans back and forth in a transversal direction across the moving ink-receiver surface. Sometimes the inkjet print head does not print on the way back. Bi-directional printing is preferred for obtaining a high area throughput. Another preferred printing method is by a "single pass printing process", which can be performed by using page wide inkjet print heads or multiple staggered inkjet print heads which cover the entire width of the ink-receiving surface. In a single pass printing process the inkjet print heads usually remain stationary and the substrate surface is transported under the inkjet print heads.

A dryer may be included in the inkjet printing device for removing at least part of the aqueous medium. Suitable dryers include devices circulating hot air, ovens, and devices using air suction.

A preferred drying device uses Carbon Infrared Radiation (CIR) to heat the outside of the paper substrate quickly.

Another preferred dryer is a NIR source emitting near infrared radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

An effective infrared radiation source preferably has an emission maximum between 0.8 and 1.5 µm. Such an infrared radiation source is sometimes called a NIR dryer.

In a preferred form the NIR radiation source is in the form of NIR LEDs, which can be mounted easily on a shuttling system of a plurality of inkjet print heads in a multi-pass inkjet printing device.

EXAMPLES

Materials

All materials used in the following examples were readily available from standard sources such as Aldrich Chemical Co. (Belgium) and Acros (Belgium) unless otherwise specified. Where used, water is demineralised water.

PB15:3 is an abbreviation used for Hostaperm™ B4G-KR, a C.I. Pigment Blue 15:3 pigment from CLARIANT.

PR254 is the abbreviation for C.I. Pigment Red 254 for which Irgazin™ DPP Red BTR from Ciba Specialty Chemicals was used.

PY150 is an abbreviation used for Fanchon™ Yellow 150:6022, a C.I. Pigment Yellow 150 from SUN CHEMICAL.

PBL7 is an abbreviation used for Printex™ 90, a carbon black pigment from EVONIK.

ID-1 is an abbreviation used for Edaplan™ 482, an acrylic polymeric dispersant from MUNZING containing about 6 mol % of a long aliphatic chain (meth)acrylate and carboxylic acid groups. ID-1 has an acid value of 175 mg KOH/g.

ID-2 is an abbreviation used for a carboxylated acrylate-styrene copolymer Joncryl™ 678 from BASF. It is employed in the examples as a 32% solids ammonia solution of Joncryl™ 678 sold as Joncryl™ 8078 by BASF. ID-2 has an acid value of 222 mg KOH/g.

NID-1 is an abbreviation used for an acrylic block copolymer dispersant expressed as solids available as Dispex™ Ultra PX 4575 (40% aqueous solution) from BASF. NID-1 has an acid value of 32 mg KOH/g.

NID-2 is an abbreviation used for an acrylic block copolymer dispersant available as Efka™ PX4701 (previously Efka™ 7701) from BASF. NID-2 has an acid value of 40 mg KOH/g.

PEG 200 is a polyethylene glycol having an average molecular weight of 200 from CLARIANT.

TEA is triethanol amine.

Proxel is an abbreviation used for Proxel™ K (5% aqueous solution of 1,2-benzisothiazolin-3-one) available from YDS CHEMICALS NV.

IJTP is an inkjet décor paper available as Technocell™ IJ-Dekor® Standard from FELIX SCHOELLER GROUP.

Measurement Methods

1. Viscosity

The viscosity of an inkjet ink was measured, using a Brookfield DV-II+ viscometer at 32° C. at a shear rate of 1,000 s$^{-1}$.

2. Particle Size

An ink sample is diluted with water to a pigment concentration of 0.002 wt %. The average particle size of pigment particles is determined with a Nicomp™ 30 Submicron Particle Analyzer based upon the principle of dynamic light scattering.

For good ink jet characteristics (jetting and print quality) the average particle size of the dispersed particles is preferably below 250 nm.

3. Ink Stability

The inkjet ink is considered a stable pigment dispersion if the average particle size does not increase by more than 20% after a heat treatment of 1 week at 60° C.

The inkjet ink is considered a stable pigment dispersion if viscosity does not increase by more than 20% after a heat treatment of 1 week at 60° C.

4. CIELAB Parameters

The reflectance spectrum of a sample was measured three times with a Gretag™ SPM50 spectrophotometer in the range from 380 up to 730 nm in steps of 10 nm. The CIE L* a* b* coordinates were determined for a 2° observer and a D50 light source. The chroma C* is calculated according to the following formula:

$$C^* = \sqrt{(a^*)^2 + (b^*)^2}$$

A meaningful improvement in colour saturation by the inkjet ink is an increase in chroma C* of at least 10%.

5. Optical Density (OD)

The optical density was measured using a Gretag™ SPM50 spectrophotometer.

A meaningful improvement in colour saturation by the inkjet ink is an increase in optical density (Δ %) of at least 15%.

Example 1

This example illustrates the improvement in colour saturation and dispersion stability for inkjet inks in accordance with the invention.

Preparation of Inkjet Inks

A concentrated aqueous pigment dispersion was made by mixing a composition according to Table 2 for 30 minutes using a Disperlux™ mixer.

TABLE 2

| Component | Concentration (wt %) |
|---|---|
| PY150 | 15.00 |
| Dispersant No1 | 7.50 |
| Proxel | 0.02 |
| Water | to complete to 100.00 wt % |

The concentrated aqueous pigment dispersion was then milled using a

Dynomill™ KDL with 0.04 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The concentrated aqueous pigment dispersion served as the basis for the preparation of the inkjet ink.

The comparative inkjet inks C-1 to C-9 and the inventive inkjet inks I-1 to I-6 were prepared by mixing the concentrated aqueous pigment dispersion and the components in the amounts as listed in Table 3 and Table 4. The addition of a dispersant N°2 was made in the form of a solution, more particularly ID-1 was added as a 50 wt % solution in water, ID-2 as a 32 wt % solution in water and NID-2 as a 30 wt % solution in water. Then water was added until 90 wt % of the total ink composition. The pH of the inkjet ink was then adjusted to 8.5 by the addition of TEA (triethanolamine), after which the remainder of water was to complete the ink composition to 100 wt %. (rem. is abbreviation for remainder).

TABLE 3

| wt % of: | C-1 | C-2 | C-3 | C-4 | C-5 | C-6 | C-7 | C-8 | C-9 |
|---|---|---|---|---|---|---|---|---|---|
| PY150 | 3.85 | 3.85 | 3.85 | 3.85 | 3.85 | 3.85 | 3.85 | 3.85 | 3.85 |
| NID-1 | 1.93 | | | 1.93 | 1.93 | 1.93 | 1.93 | 1.93 | 1.93 |
| ID-1 | | 1.93 | | | | | | 4.00 | 6.00 |
| ID-2 | | | 1.93 | | | | | | |
| NID-2 | | | | 1.00 | 2.00 | 4.00 | 6.00 | | |
| 1,2-hexanediol | 2.50 | 2.50 | 2.50 | 2.50 | 2.50 | 2.50 | 2.50 | 2.50 | 2.50 |
| Glycerol | 20.00 | 20.00 | 20.00 | 20.00 | 20.00 | 20.00 | 20.00 | 20.00 | 20.00 |
| PEG200 | 13.00 | 13.00 | 13.00 | 13.00 | 13.00 | 13.00 | 13.00 | 13.00 | 13.00 |
| Proxel | 0.20 | 0.20 | 0.20 | 0.20 | 0.20 | 0.20 | 0.20 | 0.20 | 0.20 |
| TEA | until pH = 8.5 | until pH = 8.5 | until pH = 8.5 | until pH = 8.5 | until pH = 8.5 | until pH = 8.5 | until pH = 8.5 | until pH = 8.5 | until pH = 8.5 |
| Water | rem. | rem. | rem. | rem. | rem. | rem. | rem. | rem. | rem. |
| Total | 100.00 | 100.00 | 100.00 | 100.00 | 100.00 | 100.00 | 100.00 | 100.00 | 100.00 |

TABLE 4

| wt % of: | I-1 | I-2 | I-3 | I-4 | I-5 | I-6 |
|---|---|---|---|---|---|---|
| PY150 | 3.85 | 3.85 | 3.85 | 3.85 | 3.85 | 3.85 |
| NID-1 | 1.93 | 1.93 | 1.93 | 1.93 | 1.93 | 1.93 |
| ID-1 | 0.20 | 0.50 | 0.80 | | | |
| ID-2 | | | | 0.20 | 0.50 | 0.80 |
| NID-2 | | | | | | |
| 1,2-hexanediol | 2.50 | 2.50 | 2.50 | 2.50 | 2.50 | 2.50 |
| Glycerol | 20.00 | 20.00 | 20.00 | 20.00 | 20.00 | 20.00 |
| PEG200 | 13.00 | 13.00 | 13.00 | 13.00 | 13.00 | 13.00 |
| Proxel | 0.20 | 0.20 | 0.20 | 0.20 | 0.20 | 0.20 |
| TEA | until pH = 8.5 | until pH = 8.5 | until pH = 8.5 | until pH = 8.5 | until pH = 8.5 | until pH = 8.5 |
| Water | remainder | remainder | remainder | remainder | remainder | remainder |
| Total | 100.00 | 100.00 | 100.00 | 100.00 | 100.00 | 100.00 |

Evaluation and Results

The ink stability was tested for each inkjet ink by comparing the viscosity and the average particle size with that measured after a heat treatment of 1 week at 60° C. (Δ%).

Each inkjet ink was coated with a bar coater on an IJTP paper at a wet layer thickness of 6 μm. After coating, the ink layer was dried for 2 min at 60° C. The CIELAB parameters and the optical density (OD) were determined for each inkjet ink. The chroma C* was calculated for each ink. The increase in optical density (Δ%) was calculated in view of the reference ink C-1. All results are shown in Table 5.

From Table 5, it should be clear that only the inventive inkjet inks I-1 to I-6, having a weight ratio R of the anionic polymeric dispersant ID to the non-ionic polymeric dispersant NID between 0.2 and 1.5, exhibit good dispersion stability and increased optical density. The comparative inkjet inks C-1 to C-3 having only one dispersant have either only good dispersion stability or otherwise only increased optical density. The comparative inkjet inks C-4 to C-7 having two non-ionic dispersants exhibit no increased optical density.

TABLE 5

| | Dispersant | | Ratio | Viscosity | | Particle Size | | CIELAB | | | | Density | |
|---|---|---|---|---|---|---|---|---|---|---|---|---|---|
| Ink | No1 | No2 | R | mPa·s | Δ% | nm | Δ% | L* | a* | b* | C* | OD | Δ% |
| C-1 | NID-1 | — | n.a. | 4.3 | 0 | 167 | 0 | 90.0 | −3.3 | 64.0 | 64.1 | 0.84 | Ref |
| C-2 | ID-1 | — | n.a. | 3.4 | 234 | 151 | 125 | 87.4 | 0.5 | 88.4 | 88.4 | 1.44 | 73 |
| C-3 | ID-2 | — | n.a. | 43.9 | floc | 201 | 312 | 87.0 | 1.6 | 90.5 | 90.5 | 1.49 | 78 |
| C-4 | NID-1 | NID-2 | 0 | 4.5 | 52 | 159 | 34 | 89.9 | −3.2 | 60.6 | 60.7 | 0.78 | 0 |
| C-5 | NID-1 | NID-2 | 0 | 5.1 | 14 | 161 | 11 | 89.7 | −3.1 | 59.5 | 59.6 | 0.76 | 0 |
| C-6 | NID-1 | NID-2 | 0 | 6.4 | 0 | 161 | 3 | 89.9 | −3.1 | 58.8 | 58.9 | 0.75 | 0 |
| C-7 | NID-1 | NID-2 | 0 | 8.0 | 0 | 165 | 2 | 89.8 | −2.8 | 58.8 | 58.9 | 0.75 | 0 |
| C-8 | NID-1 | ID-1 | 2.1 | 6.0 | 93 | 159 | 59 | 88.0 | −1.8 | 73.9 | 73.9 | 1.06 | 26 |
| C-9 | NID-1 | ID-1 | 3.1 | 7.2 | 119 | 161 | 75 | 88.9 | −2.1 | 72.5 | 72.5 | 1.00 | 20 |
| I-1 | NID-1 | ID-1 | 0.1 | 3.7 | 12 | 162 | 2 | 89.8 | −3.2 | 70.8 | 70.9 | 0.96 | 15 |
| I-2 | NID-1 | ID-1 | 0.3 | 3.8 | 1 | 158 | 10 | 89.4 | −2.9 | 72.8 | 72.9 | 1.01 | 20 |
| I-3 | NID-1 | ID-1 | 0.4 | 4.4 | 1 | 163 | 6 | 89.7 | −3.0 | 74.3 | 74.4 | 1.03 | 23 |
| I-4 | NID-1 | ID-2 | 0.1 | 4.0 | 0 | 160 | 6 | 90.2 | −3.4 | 71.9 | 72.0 | 0.97 | 16 |
| I-5 | NID-1 | ID-2 | 0.3 | 4.0 | 0 | 167 | 9 | 89.1 | −2.2 | 81.1 | 81.1 | 1.19 | 43 |
| I-6 | NID-1 | ID-2 | 0.4 | 4.3 | 15 | 166 | 17 | 88.8 | −1.5 | 84.4 | 84.4 | 1.28 | 53 |

Example 2

This example illustrates the use of an inkjet ink in accordance with the invention for the manufacturing of decorative panels.

Preparation Inkjet Inks

A concentrated pigment dispersion was prepared with PY150 and the dispersant NID-1 as shown above with Table 2.

The comparative inkjet ink COMP-1 and the inventive inkjet inks INV-1 and INV-1 were prepared by mixing the concentrated aqueous pigment dispersion and the components in the amounts as listed in Table 6. The addition of a dispersant N°2 was made in the form of a solution, more particularly ID-1 was added as a 50 wt % solution in water and ID-2 as a 32 wt % solution in water. Then water was added until 90 wt % of the total ink composition. The pH of the inkjet ink was then adjusted to 8.5 by the addition of TEA (triethanolamine), after which the remainder of water was to complete the ink composition to 100 wt %. For optimal jetting reliability a viscosity at 32° C. of about 4.5 mPa·s is desired. An amount of PEG200 was selected to arrive at such viscosity for each of the inkjet inks COMP-1, INV-1 and INV-2.

TABLE 6

| wt % of: | COMP-1 | INV-1 | INV-2 |
|---|---|---|---|
| PY150 | 3.85 | 3.85 | 3.85 |
| NID-1 | 1.93 | 1.93 | 1.93 |
| ID-1 | | 2.00 | |
| ID-2 | | | 1.00 |
| 1,2-hexanediol | 2.50 | 2.50 | 2.50 |
| Glycerol | 20.00 | 20.00 | 20.00 |
| PEG200 | 13.00 | 10.00 | 11.00 |
| Proxel | 0.20 | 0.20 | 0.20 |
| TEA | until pH = 8.5 | until pH = 8.5 | until pH = 8.5 |
| Water | remainder | remainder | remainder |
| Total | 100.00 | 100.00 | 100.00 |

Evaluation and Results

The ink stability was tested for each inkjet ink by comparing the viscosity and the average particle size with that measured after a heat treatment of 1 week at 60° C. (Δ%).

Each inkjet ink was coated with a bar coater on an IJTP paper at a wet layer thickness of 6 μm. After coating, the ink layer was dried for 2 min at 60° C. The CIELAB parameters and the optical density (OD) were determined for each inkjet ink. The chroma C* was calculated for each ink. The increase in optical density (Δ%) was calculated in view of the reference ink C-1. All results are shown in Table 7.

Both inventive inkjet inks INV-1 and INV-2 exhibited a clear increase in chroma C* and optical density. The inkjet ink INV-1 was selected to compose a CRYK inkjet ink set for manufacturing of decorative panels. Printing reliability in an industrial environment of the upmost importance.

Preparation of a CRYK Inkjet Ink Set.

Preparation of Concentrated Pigment Dispersions CPK, CPC and CPR

The concentrated aqueous pigment dispersions CPK, CPC and CPR were made in the same manner by mixing a composition according to Table 8 containing respectively a black, cyan and red colour pigment for 30 minutes with a Disperlux™ mixer.

TABLE 8

| wt % of component | CPK (Black) | CPC (Cyan) | CPR (Red) |
|---|---|---|---|
| PB7 | 15.00 | — | — |
| PB15:3 | — | 15.00 | — |
| PR154 | — | — | 25.00 |
| ID-1 | 15.00 | 15.00 | 12.50 |
| Water | 70.00 | 70.00 | 62.50 |

Each concentrated aqueous pigment dispersion was then milled using a Dynomill™ KDL with 0.4 mm yttrium stabilized zirconium beads YTZ™ Grinding Media (available from TOSOH Corp.). The mill was filled to half its volume with the grinding beads and the dispersion was milled for 3 hours at flow rate of 200 mL/min and a rotation speed of 15 m/s. After milling, the dispersion is separated from the beads. The resulting concentrated aqueous pigment dispersions CPK, CPC and CPR served as the basis for the preparation of respectively the black, cyan and red inkjet inks.

Preparation of Cyan, Red and Black Inkjet Inks

Each of the inkjet inks C, R and K were prepared in the same manner by diluting the corresponding concentrated pigment dispersions with the other ink ingredients according to Table 9 expressed in wt % based on the total weight of the ink. The component TEA was used to obtain a desired pH of 8.5 in the aqueous inkjet ink. Water was added to complete the ink to 100.00 wt %.

TABLE 9

| wt % of ink ingredient | C | R | K |
|---|---|---|---|
| CPC | 14.67 | — | — |
| CPR | — | 10.80 | — |
| CPK | — | — | 20.00 |
| Proxel | 0.20 | 0.20 | 0.20 |
| 1,2-hexanediol | 3.00 | 3.00 | 3.00 |
| Glycerine | 20.00 | 20.00 | 20.00 |
| PEG200 | 14.00 | 13.50 | 12.50 |
| Water | 60.00 | 60.00 | 60.00 |
| Triethanolamine | to pH 8.5 | to pH 8.5 | to pH 8.5 |
| Water to complete to | 100.00 | 100.00 | 100.00 |

TABLE 7

| Ink | Dispersant No1 | Dispersant No2 | Ratio R | Viscosity mPa·s | Viscosity Δ% | Particle size nm | Particle size Δ% | CIELAB L* | CIELAB a* | CIELAB b* | CIELAB C* | Density OD | Density Δ% |
|---|---|---|---|---|---|---|---|---|---|---|---|---|---|
| COMP-1 | NID-1 | — | n.a. | 4.5 | 0 | 172 | 0 | 90.7 | −3.5 | 63.9 | 64.0 | 0.81 | Ref |
| INV-1 | NID-1 | ID-1 | 1.0 | 4.6 | 0 | 179 | 0 | 89.6 | −2.4 | 76.1 | 76.1 | 1.06 | 31% |
| INV-2 | NID-1 | ID-2 | 0.5 | 4.4 | 13 | 177 | 10 | 89.1 | −1.9 | 83.3 | 83.3 | 1.25 | 54% |

A CRYK inkjet ink set was formed by combining the yellow inkjet ink INV-1 with the inkjet inks C, R and K.

Manufacturing of Decorative Panels

A decorative layer was obtained by printing a decorative wood pattern on a décor paper IJTP using the CRYK inkjet ink set in a custom built multi-pass inkjet printer equipped with Samba™ G3L print heads from FUJIFILM Dimatix at a head temperature of 32° C. The dry weight of the jetted ink was less than 1.0 g/m².

The printed deco paper was then impregnated with an aqueous solution containing 60 wt % of melamine-formaldehyde based resin and dried to a residual humidity of about 8 g/m². It was found that homogenous impregnation was accomplished in a time frame acceptable for industrial manufacturing. A similar assembly was made as shown in FIG. 1, wherein a prepared décor paper was interposed between a MDF core and a protective layer of melamine-formaldehyde resin impregnated paper containing corundum for durability. The assembly was then heat pressed at 195° C. for 22 seconds at a pressure of 60 kg/cm². The obtained floor laminate exhibited good image quality and adhesion quality.

The inkjet inks COMP-1 and INV-1 were coated with a bar coater on an IJTP paper at a wet layer thickness of 6 μm. After coating, the ink layers were dried for 2 min at 60° C. Both coated samples were then impregnated and heat pressed in the same manner as the inkjet printed images. It was observed that the improved colour saturation of INV-1 versus COMP-1 was still present after resin impregnation and heat pressing.

REFERENCE SIGNS LIST

TABLE 10

| | |
|---|---|
| 1 | Decorative panel |
| 2 | Protective layer |
| 3 | Outermost ink receiving layer |
| 4 | Inner ink receiving layer |
| 5 | Core layer |
| 6 | Jetted and dried colour image |
| 7 | Balancing layer |
| 8 | Tongue |
| 9 | Groove |

The invention claimed is:

1. An aqueous inkjet ink containing a yellow pigment selected from the group consisting of C.I. Pigment Yellow 83, C.I. Pigment Yellow 97, C.I. Pigment Yellow 110, C.I. Pigment Yellow 120, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214, and mixed crystals thereof; a non-ionic polymeric dispersant NID; and an anionic polymeric dispersant ID; wherein the weight ratio R of the anionic polymeric dispersant ID to the non-ionic polymeric dispersant NID is between 0.1 and 1.5.

2. The aqueous inkjet ink of claim 1, wherein the yellow pigment is C.I. Pigment Yellow 150 or a mixed crystal thereof.

3. The aqueous inkjet ink of claim 1, wherein the ionic groups in the anionic polymeric dispersant ID are carboxylic acid groups or salts thereof.

4. The aqueous inkjet ink of claim 1, wherein the anionic polymeric dispersant ID is a carboxylated acrylic copolymer or a carboxylated acrylate-styrene copolymer.

5. The aqueous inkjet ink of claim 1, wherein the non-ionic polymeric dispersant NID is an acrylic block copolymer.

6. The aqueous inkjet ink of claim 1, wherein the ratio R of the anionic polymeric dispersant ID to the non-ionic polymeric dispersant NID is between 0.3 and 1.0.

7. The aqueous inkjet ink of claim 1, wherein the yellow pigment is present in an amount of 2.0 to 5.0 wt % of yellow pigment based on the total weight of the inkjet ink.

8. The aqueous inkjet ink of claim 1, wherein the average particle size as measured by dynamic light scattering is between 100 and 200 nm.

9. A pigmented aqueous inkjet ink set for manufacturing decorative panels comprising:
   a) a cyan aqueous inkjet ink containing a copper phthalocyanine pigment;
   b) a red aqueous inkjet ink containing a red pigment selected from the group consisting of C.I. Pigment Red 122, C.I. Pigment Red 176, C.I. Pigment Red 188, C.I. Pigment Red 207, C.I. Pigment Red 242, C.I. Pigment Red 254, C.I. Pigment Red 272, and mixed crystals thereof;
   c) a yellow aqueous inkjet ink according to claim 1; and
   d) a black aqueous inkjet ink containing a carbon black pigment.

10. The pigmented aqueous inkjet ink of claim 9, wherein the red pigment is C.I. Pigment Red 254 or a mixed crystal thereof.

11. An inkjet printing method for manufacturing decorative panels comprising the steps of:
   a) providing a paper substrate including one or more ink receiving layers;
   b) jetting a colour image with pigmented aqueous inkjet inks from the pigmented aqueous inkjet ink set according to claim 9 on the paper substrate including one or more ink receiving layers; and
   c) drying the jetted colour image.

12. The inkjet printing method of claim 11, wherein the jetting of the colour image is performed in a multi-pass mode.

13. A method for manufacturing decorative panels including the inkjet printing method of claim 11; wherein the paper substrate having the jetted and dried colour image is impregnated with a thermosetting resin.

14. The method for manufacturing decorative panels of claim 13, wherein the impregnated paper substrate is heat pressed between a core layer and a protective layer and cut into a decorative panel selected from the group consisting of flooring, kitchen, furniture and wall panels.

15. The method for manufacturing decorative panels of claim 13, wherein the protective layer includes a melamine-based thermosetting resin.

* * * * *